(12) United States Patent
Arnault et al.

(10) Patent No.: US 10,030,715 B2
(45) Date of Patent: Jul. 24, 2018

(54) BEARING, CLUTCH BEARING DEVICE AND MOTOR VEHICLE EQUIPPED WITH SUCH A CLUTCH BEARING DEVICE

(71) Applicants: Benoit Arnault, Saint-Cyr-sur-Loire (FR); Philippe Walter, Fondettes (FR)

(72) Inventors: Benoit Arnault, Saint-Cyr-sur-Loire (FR); Philippe Walter, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 324 days.

(21) Appl. No.: 14/879,187

(22) Filed: Oct. 9, 2015

(65) Prior Publication Data

US 2016/0102716 A1  Apr. 14, 2016

(30) Foreign Application Priority Data

Oct. 13, 2014 (EP) .................................. 14306618

(51) Int. Cl.
  *F16D 23/14* (2006.01)
  *F16C 19/02* (2006.01)
  *F16C 33/30* (2006.01)
  *F16C 33/80* (2006.01)

(52) U.S. Cl.
  CPC .............. *F16D 23/14* (2013.01); *F16C 19/02* (2013.01); *F16C 33/30* (2013.01); *F16C 33/80* (2013.01)

(58) Field of Classification Search
  CPC .......... F16D 23/12; F16D 23/14; F16C 19/02; F16C 33/30; F16C 33/80
  See application file for complete search history.

(56) References Cited

U.S. PATENT DOCUMENTS 4,506,774 A * 3/1985 Block ..................... F16D 23/14
                                              192/110 B

FOREIGN PATENT DOCUMENTS

| DE | 19933634 A1 | 1/2001 |
|---|---|---|
| DE | 102005053612 A1 | 5/2007 |
| DE | 102007040459 A1 | 3/2009 |
| DE | 102008039489 A1 | 2/2010 |
| EP | 1225360 A1 | 7/2002 |
| FR | 2818714 A1 | 6/2002 |
| FR | 2898951 A1 | 9/2007 |
| FR | 2979677 A1 | 3/2013 |
| JP | 411210763 A | 8/1999 |
| WO | 2009095101 A2 | 8/2009 |

* cited by examiner

*Primary Examiner* — Huan Le
(74) *Attorney, Agent, or Firm* — Bryan Peckjian; SKF USA Inc. Patent Dept.

(57) ABSTRACT

A bearing forming a clutching-declutching bearing for a motor vehicle, the bearing defining a central axis and including an outer ring free to rotate around the central axis, an inner ring, rolling elements disposed between the outer ring and inner ring and a flange mounted on the inner ring. The flange is at least partially inserted in a recess which is provided in a radial end portion of the inner ring and which is distinct from an inner bore of the inner ring.

14 Claims, 9 Drawing Sheets

BEARING, CLUTCH BEARING DEVICE AND MOTOR VEHICLE EQUIPPED WITH SUCH A CLUTCH BEARING DEVICE

CROSS REFERENCE TO RELATED APPLICATION

This is a Non-Provisional Patent Application, filed under the Paris Convention, claiming the benefit of Europe (EP) Patent Application Number 14306618.1, filed on 13 Oct. 2014 (13.10.2014), which is incorporated herein by reference in its entirety.

TECHNICAL FIELD OF THE INVENTION

The present invention relates to a bearing forming a clutching-declutching bearing for a motor vehicle. This invention also relates to a clutch bearing device including a bearing of the above-mentioned type. Finally, this invention relates to a motor vehicle equipped with such a clutch bearing device.

BACKGROUND ART OF THE INVENTION

In the automotive industry, it is known to use a bearing comprising an inner ring, an outer ring and rolling elements, arranged in a volume between the rings, for constituting a clutching-declutching bearing and making it possible to control a diaphragm spring which is an example of a declutching mechanism known per se. Such a bearing can be incorporated into a clutch bearing device which includes a metal sleeve for reception of a control device and a flange for sealing a reception volume for the rolling elements. The sealing flange is centered in the inner bore of the inner ring. The sealing flange is mounted in a self-centering manner relative to the inner ring. The self-centering function of the sealing flange is guaranteed when the inner ring supports the metal sleeve via a contact surface. The contact between the inner ring and the metal sleeve should be guaranteed for any clearance movements of the clutch bearing device. When the contact between these parts is interrupted, because of a clearance movement of the device, the self-centering and sealing functions of the flange are compromised.

Such a contact, between the inner ring and the metal sleeve, in order to center the sealing flange, can be obtained, as known for example from WO-A-2009/095101, with a device, where a support plate is inserted between the inner ring and the metal sleeve for guaranteeing a continuous support between the inner ring and the metal sleeve. However, the insertion of an additional element has a considerable impact on the cost and on the assembling difficulties of the clutch bearing device.

In addition, it is known from FR-A-2 898 951 that the support function between the inner ring and the metal sleeve can be obtained by increasing the contact surface area. For this purpose, the metal sleeve is equipped with a radial shoulder. This approach has, however, a negative consequence on the cost and weight of the clutch bearing device.

Finally, it is known from FR-A-2 979 677, to provide the metal sleeve with a protrusion. The sealing flange is in contact with that protrusion. This contact fulfils a self-centering function. However, the contact between the inner ring and the metal sleeve is not guaranteed during a clearance movement and the protrusion of the metal sleeve is not adequate for guaranteeing the self-centering function.

SUMMARY OF THE INVENTION

An object of the invention is to remedy these drawbacks more particularly by proposing a novel bearing forming a clutching-declutching bearing where the support function between the metal sleeve and the inner ring, as well as the self-centering function of the sealing flange, is guaranteed for limited clearance movements of the parts of the device.

To this end, the invention concerns a bearing forming a clutching-declutching bearing for a motor vehicle, the bearing defining a central axis and including an outer ring free to rotate around the central axis, an inner ring, rolling elements disposed between the outer ring and the inner ring. The bearing also includes a flange mounted on the inner ring. According to the invention, the flange is at least partially inserted in a recess which is provided in a radial end portion of the inner ring and which is distinct from an inner bore of the inner ring.

Owing to the invention, the self-centering function of the flange is obtained by the recess provided in the inner ring and the flange provides the sealing function in any operative situation of the device and therefore for any clearance movements of the parts of the device. Because of this solution, the support contact between the inner ring and the metal sleeve can be increased by an extension of the contact surface area, in particular an extension of the radial end of the inner ring. In this way, the contact between the inner ring and the metal sleeve is guaranteed with small cost and without additional elements. Another advantage of the invention is that assembling of the bearing is simple and fast.

According to further aspects of the invention which are advantageous but not compulsory, such a bearing may incorporate one or several of the following features taken in any admissible configuration:

The diameter of an inner bore of the flange is greater than or equal to the diameter of the inner bore of the inner ring.

The recess of the inner ring is radially open towards the inner bore of the inner ring and is provided on an inner surface of the radial end portion of the inner ring.

The flange includes a flat annular portion inserted in the recess and an external skirt.

The flange includes a flat annular portion folded over a central portion equipped with the external skirt.

The flat annular portion is in contact with the inner surface and the flange includes a bent inner radial end which is inserted in the recess.

The recess is a groove provided on an inner surface of the radial end portion of the inner ring and the flange includes a flat annular portion, an external skirt and a protruding portion inserted in the recess and which connects the flat annular portion and an external skirt.

The recess is defined by at least one punched out portion of the inner ring which is axially bent towards the outer ring.

The recess is defined by a chamfer and the flange is provided with a bent inner radial end inserted in the chamfer.

The recess is defined by at least one notch provided on a radial edge of the inner ring and an internal protrusion of the flange is inserted in the notch.

The recess is formed by a stamping and/or cutting and/or punching process.

The flange acts as a sealing device for sealing an opening between the outer ring and the inner ring.

The flange either remains at a small distance from the outer ring so as to form a labyrinth sealing or contacts the outer ring, preferably by means of an elastomeric portion.

The invention also provides a clutch bearing device comprising a metal sleeve for reception of the control device and a first bearing such as mentioned above, the bearing being capable of acting on a diaphragm spring of a clutch mechanism.

Finally the invention provides a motor vehicle equipped with a clutch bearing device such as mentioned above.

BRIEF DESCRIPTION OF THE DRAWINGS

The present invention and its advantages will be well understood on the basis of the following description, which is given as an illustrative example, without restricting the scope of the invention and in relation with the annexed drawings. In the drawings.

DETAILED DESCRIPTION OF SOME EMBODIMENTS

A non represented motor vehicle is equipped with a clutch bearing device 100 which comprises a bearing 1. The clutch bearing device 100 also comprises a metal sleeve 102 for reception of a control device. In particular, the control device is a hydraulic control sub-assembly that includes a stationary support, in general mounted on the casing of a gear box (not shown). The control device also includes a piston received entirely inside an annular chamber provided in the clutch bearing device 100 and designed to receive a control hydraulic fluid fed in via a fitting. The piston is equipped with two sealing gaskets in contact respectively with a radially inner wall and with a radially outer wall of the chamber (not shown).

The bearing 1 forms a clutching-declutching bearing having its inner ring referenced 2 and its outer ring referenced 4. The inner ring 2 consists of an axial end portion 2A, an intermediate curved portion 2B and a radial end portion 2C. The outer ring 4, as well, consists of an axial end portion 4A, an intermediate curved portion 4B and a radial end portion 4C. A series of balls 6 is held in position in a volume 8 defined between the intermediate curved portion 2B of the inner ring 2 and the intermediate curved portion 4B of the outer ring 4, by means of a cage 10. Moreover, the inner ring 2 and the outer ring 4 define a first opening 8A of volume 8, between the axial end portions 2A and 4A, and a second opening 8B of volume 8, between the radial end portions 2C and 4C.

The axes of symmetry of the rings 2 and 4 are referenced respectively X2 and X4, these axes coinciding with each other when the bearing 1 is the assembled configuration. Moreover, axes X2 and X4 coincide with an axis X1 which is the central axis of symmetry of the bearing 1.

Bearing 1 also includes a gasket 12 which fulfils a sealing function for the first opening 8A. This gasket 12 comprises a metal armature 14, an elastomer body 16 anchored to the outer ring 4, with a lip 18 that bears slidably against the inner ring 2.

Figure 1:
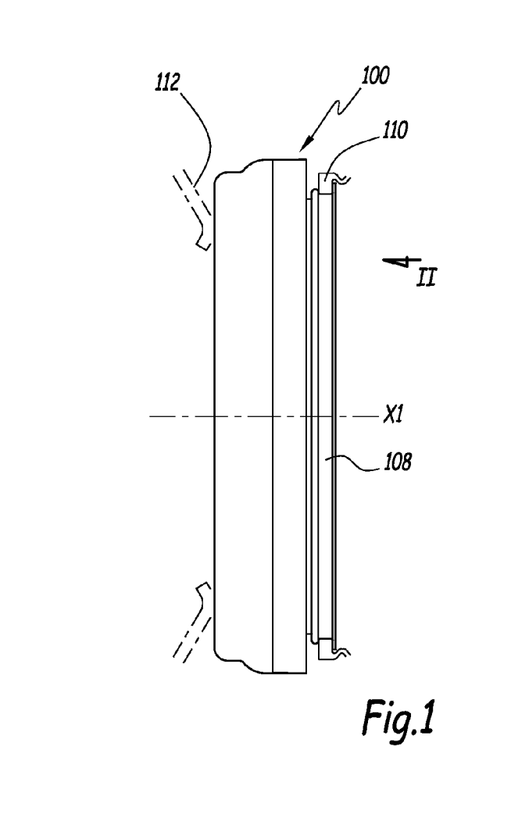
FIG. 1 is a side view of a clutch bearing device of the invention that incorporates a bearing according to a first embodiment of the invention.
Figure 2:
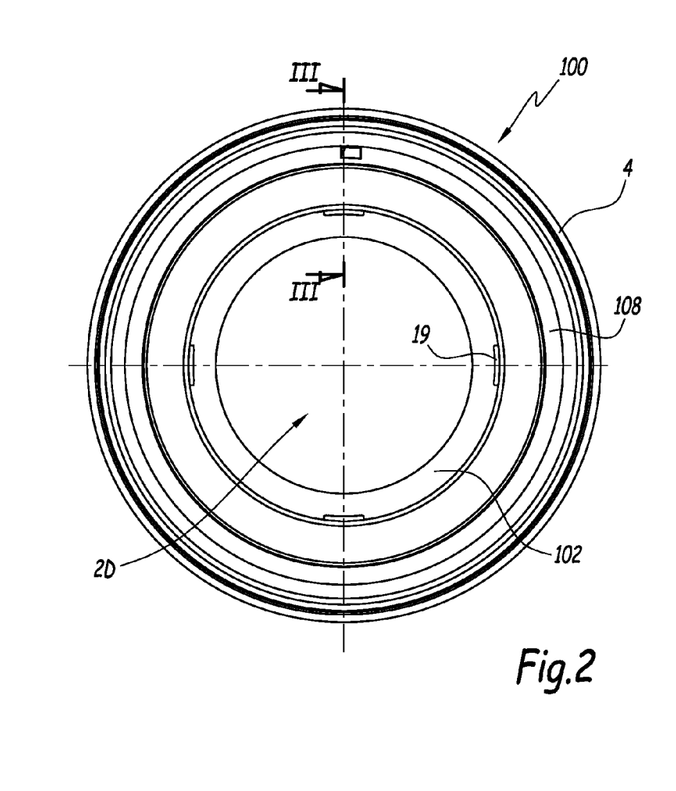
FIG. 2 is a rear view of the clutch bearing device of FIG. 1 along arrow II on this figure.
Figure 3:
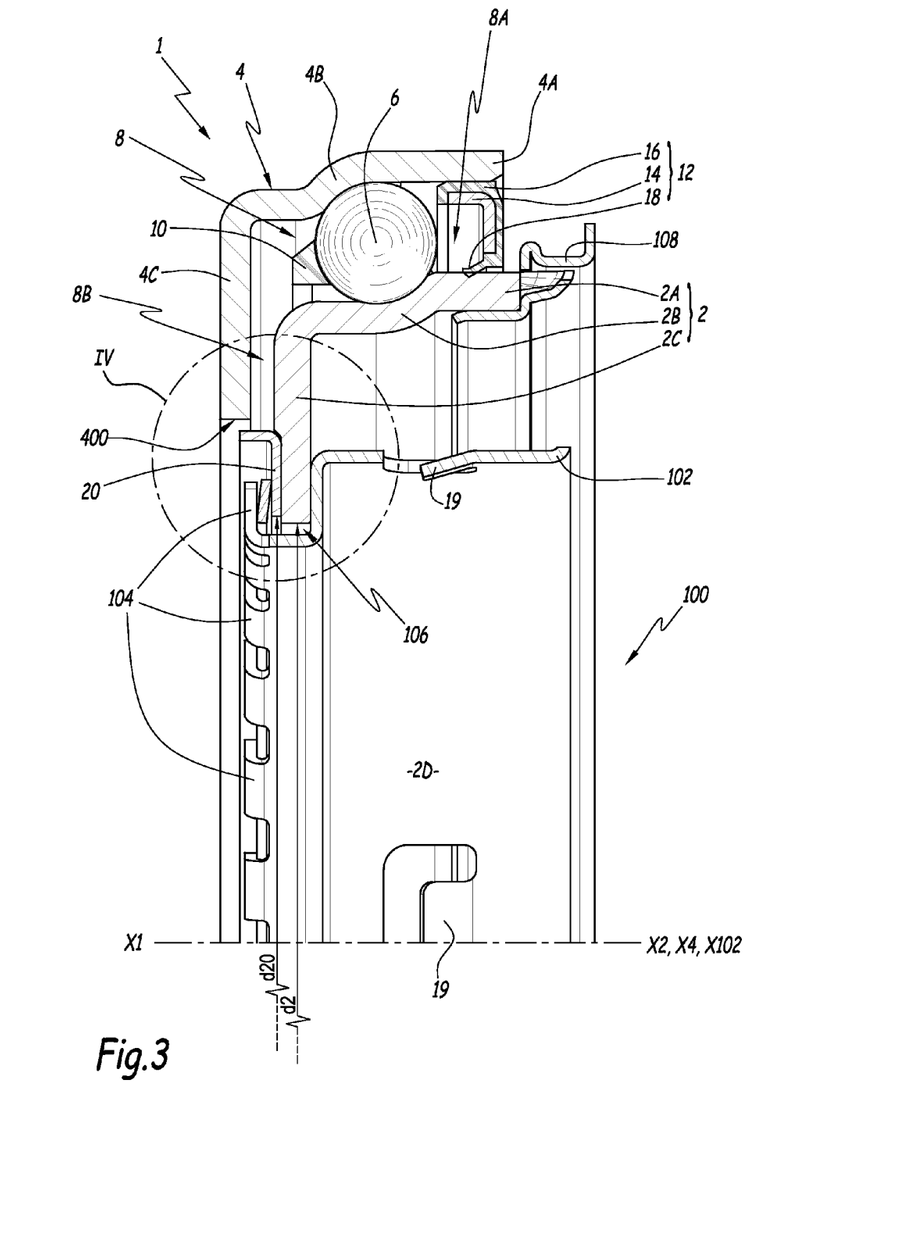
FIG. 3 is an axial semi-section view of the clutch bearing device of FIGS. 1 and 2, along cutting section on FIG. 2.
Figure 4:
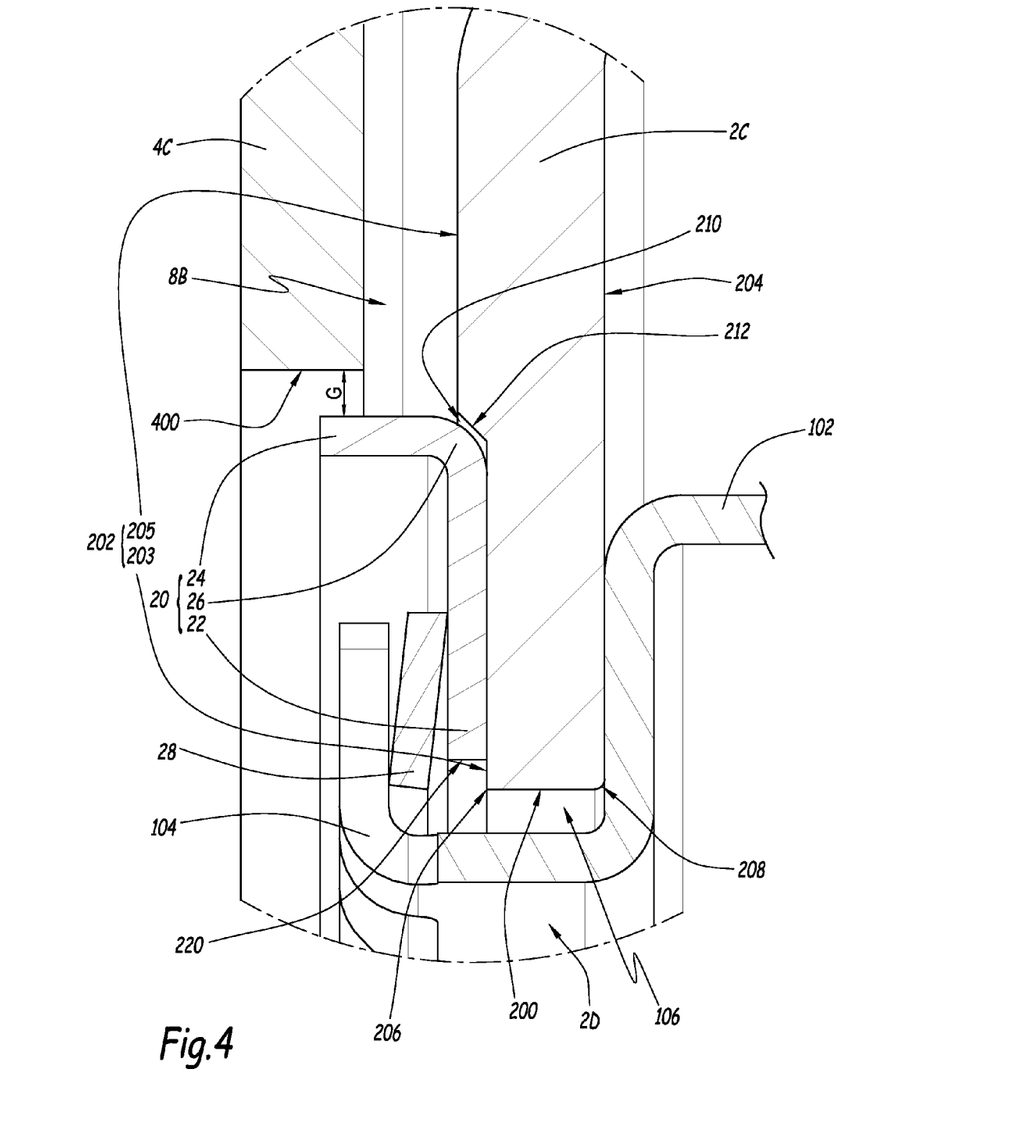
FIG. 4 is a cut view on a larger scale corresponding to detail IV on FIG. 3.

The outer ring 4 is in abutment against a diaphragm spring 112 that is shown partially by its tips on FIG. 1 only in chain-dotted lines. This diaphragms spring 112 is part of a declutching mechanism, which is known per se and which is not described in any further detail.

The radial end portion 4C of the outer ring 4 is provided with a radial inner edge 400.

The radial end portion 2C of the inner ring 2 is provided with a radial inner edge 200. This radial edge 200 defines an inner bore 2D of the inner ring 2. Moreover the radial edge 200 defines a diameter d2 of the inner bore 2D.

With reference to the second opening 8B, the radial end portion 2C of the inner ring 2 is provided with an inner surface 202 and an outer surface 204. Again with reference to the second opening 8B, inner surface 202 and radial edge 200 define a inner corner 206, as well as outer surface 204 and radial edge 200 define an outer corner 208.

The radial end portion 2C is equipped with a recess 210 provided on inner surface 202. In other words, inner surface 202 includes a floor 203 which is offset along the axis X2 with respect to remaining portion 205 of surface 202, in a direction away from radial end portion 4C. This recess 210 of inner ring 2 is radially open towards the inner bore 2D.

Recess 210 is provided with a frustoconical edge 212 which is inclined with respect to the axis X2 and converges towards floor 203. This edge 212 performs a transition between surface 202 and floor 203.

In practice, radial edge 200 and frustoconical edge 212 do not coincide.

Metal sleeve 102 is mounted on inner ring 2 and it is designed to be fastened to a thrust element whose axial position, along the axis X1 is controlled by the piston (not shown).

Metal sleeve 102 is mounted in such a way to allow its radial displacement relative to inner ring 2. More precisely, sleeve 102 is provided with tabs 104 that define an outer groove or zone 106 for receiving radial end portion 2C of inner ring 2, with a radial clearance, so that end portion 2C can slide radially in zone 106. This allows the relative position of parts 2 and 102 to be adjusted perpendicularly to the axis X1. This makes it possible to accommodate a misalignment between axis X1 and a central axis X102 of metal sleeve 102 when these axes are parallel but do not coincide. A thrust ring 108 is mounted in tight-fitted manner on inner ring 2. A bellows 110, which is shown partially on FIG. 1 only, is mounted around the clutch bearing device 100 in order to isolate it from the outside. An edge of the bellows 110 is received in ring 108.

In addition, metal sleeve 102 is provided with punched out portions 19 enabling it to be hooked in an external peripheral groove in the thrust element, thereby guaranteeing that a thrust force is transmitted effectively between the piston and metal sleeve 102. The geometrical shape of sleeve 102 at the level of the zone 106 makes it possible to transmit the thrust force to radial end portion 2C of inner ring 2, this force being transmitted therefrom, between inner ring 2 and outer ring 4, via balls 6. In practice, inner ring 2 is prevented from rotating around axis X2, whereas outer ring 4 rotates around the axis X4, at a speed that depends, in particular, on the engine speed.

A metallic flange 20 is disposed between tabs 104 and radial end portion 2C of inner ring 2. This flange 20 defines an inner bore with a diameter d20. This diameter d20 is greater than or equal to the diameter d2. Flange 20 includes a flat annular portion 22 and an axial external skirt 24. Skirt 24 extends axially in front of the radial edge 400 of the outer ring 4. A gap G is defined between the skirt 24 and the radial edge 400 of the outer ring 4. This gap G is the radial distance between these two parts. In other words, it is measured radially with respect to axis X1. The transition between portion 22 and skirt 24 is performed by a curved portion 26.

By means of the gap G, flange 20 acts as a labyrinth sealing device for sealing opening 8B. In operation, the minimum value of gap G is 0.1 mm. In any case, gap G is a small distance between items 20 and 4.

According to a non represented alternative embodiment of the invention, flange 20 is provided with an elastomeric sealing lip which bears slidely against radial end portion 4C.

Flange 20 is partially inserted in the recess 210 since portion 22 is globally accommodated in recess 210, whereas the skirt 24 extends outside recess 210. Annular portion 22 is entirely in contact with floor 203 and curved portion 26 is adjacent to frustoconical edge 212.

Annular portion 22 defines a radial inner edge 220 of flange 20. This radial inner edge 220 defines diameter d20, which is greater than diameter d2, as mentioned here-above. Edge 220 is placed in the recess 210.

A conical ring 28, disposed between tabs 104 and flange 20, guarantees a continuous axial thrust between flange 20 and sleeve 102 and therefore between inner ring 2 and sleeve 102, even during any relative radial self-centring movements therebetween. By means of the radial clearance between radial end portion 2C and sleeve 102, at the level of zone 106, sleeve 102 is mounted in self-centring manner with respect to conical ring 28.

FIGS. 5 to 13 partially show several bearings 1 according to alternative embodiments of the invention. The elements of these bearings 1 identical to the corresponding ones of the first embodiment bear the same references and they are not described in detail, insofar as the description here-above can be transposed to these elements.

Figure 5:
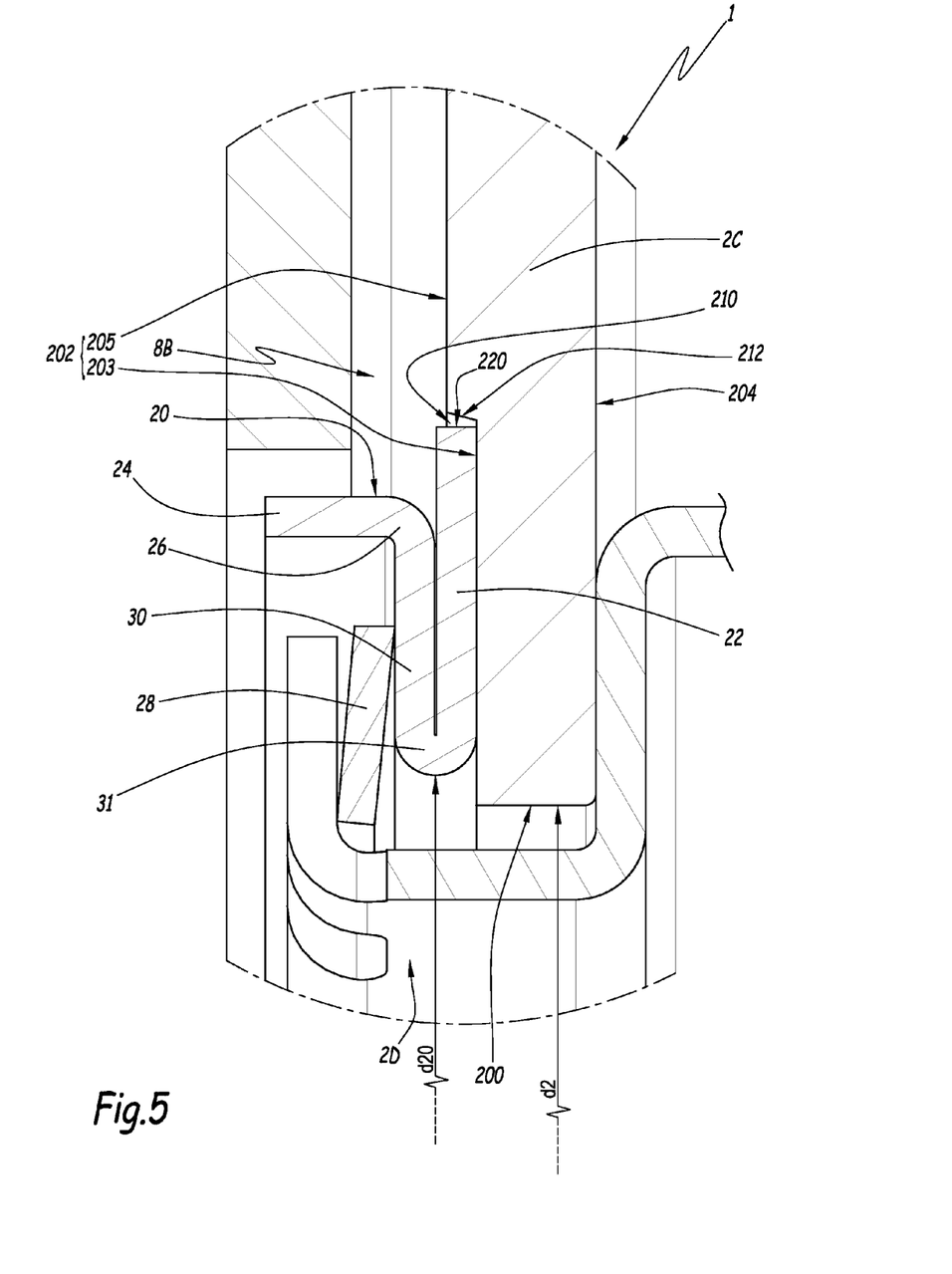
FIG. 5 is a cut view similar to FIG. 4, for a bearing according to a second embodiment of the invention.

In the second embodiment of the invention, which is shown in FIG. 5, flange 20 includes a flat annular portion 22 which is in contact with floor 203 of recess 210 and which is axially aligned with inclined edge 212. Annular portion 22 is folded over a central portion 30 of flange 20. The transition between central portion 30 and annular portion 22 is performed by a bent portion 31. Bent portion 31 defines the inner diameter d20 of the flange 20. A radial outer edge 220 of annular portion 22 is adjacent to the frustoconical edge 212 of the recess 210. The central portion 30 is equipped with an external skirt 24 and the transition between central portion 30 and skirt 24 is performed by a curved portion 26. The conical ring 28 is in abutment against the central portion 30 of the flange 20.

In this embodiment also, one has the relationship d20>d2, where d2 is defined as in the first embodiment.

Figure 6:
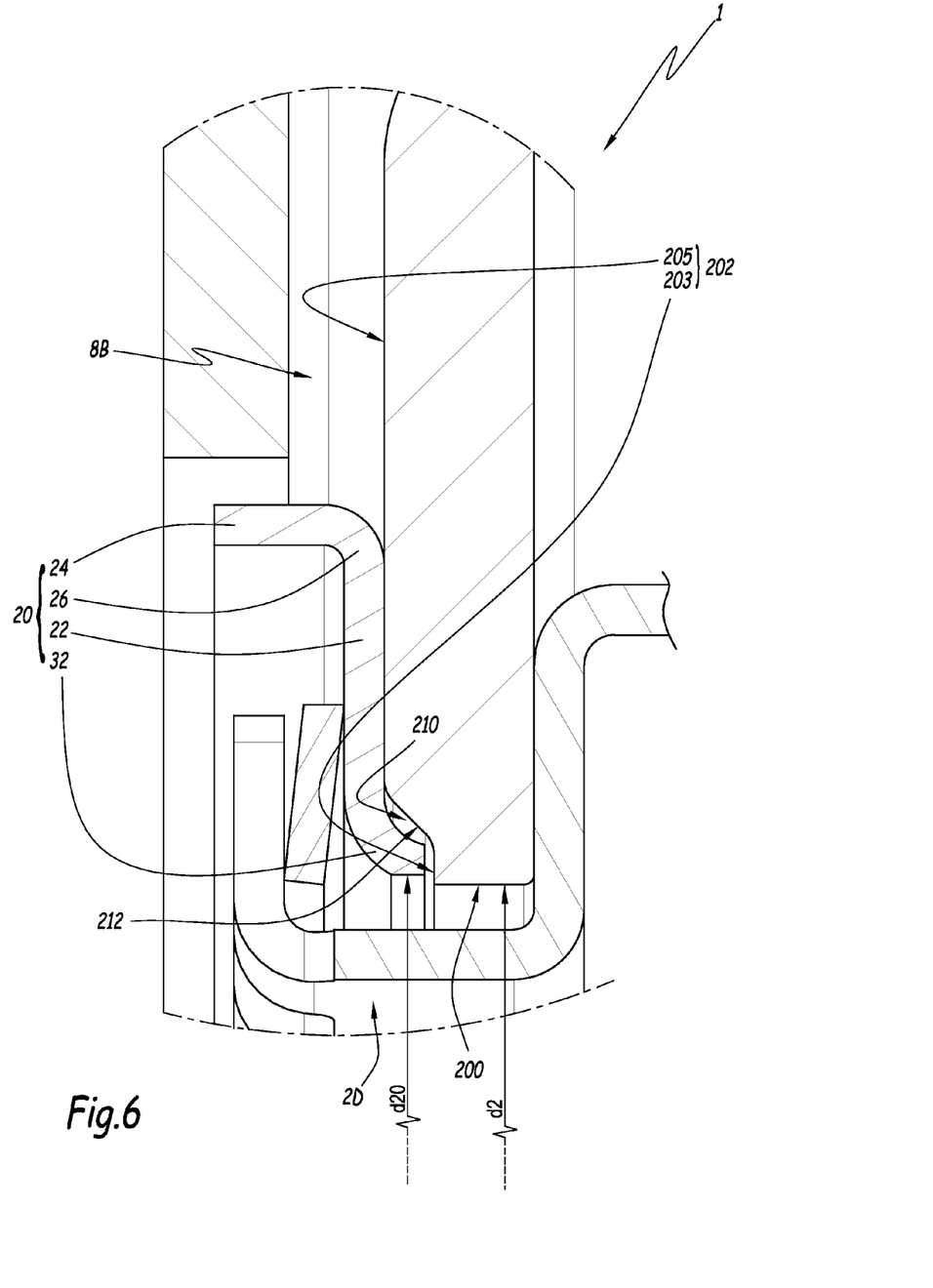
FIG. 6 is a cut view similar to FIG. 4 for a bearing according to a third embodiment of the invention.

In the third embodiment of the invention, which is shown in FIG. 6, recess 210 is provided with a frustoconical edge 212 between part 205 of inner surface 202 and its floor 203. Flange 20 is provided with a flat annular portion 22, which is in contact with inner surface 202, and with a bent radial inner end 32, which is inserted in recess 210.

Figure 7:
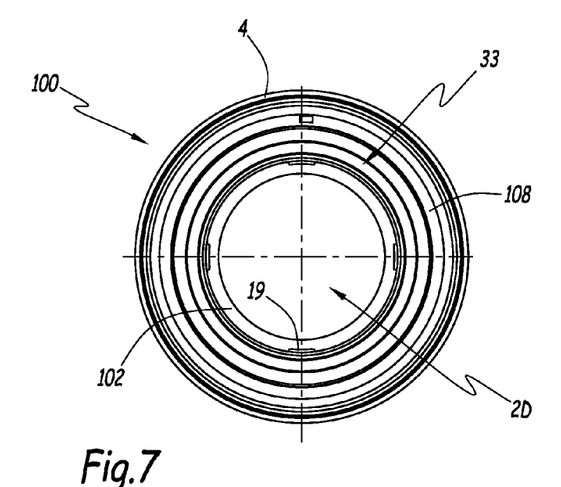
FIG. 7 is a rear view similar to FIG. 2 but on a smaller scale, for a bearing according to a fourth embodiment of the invention.
Figure 8:
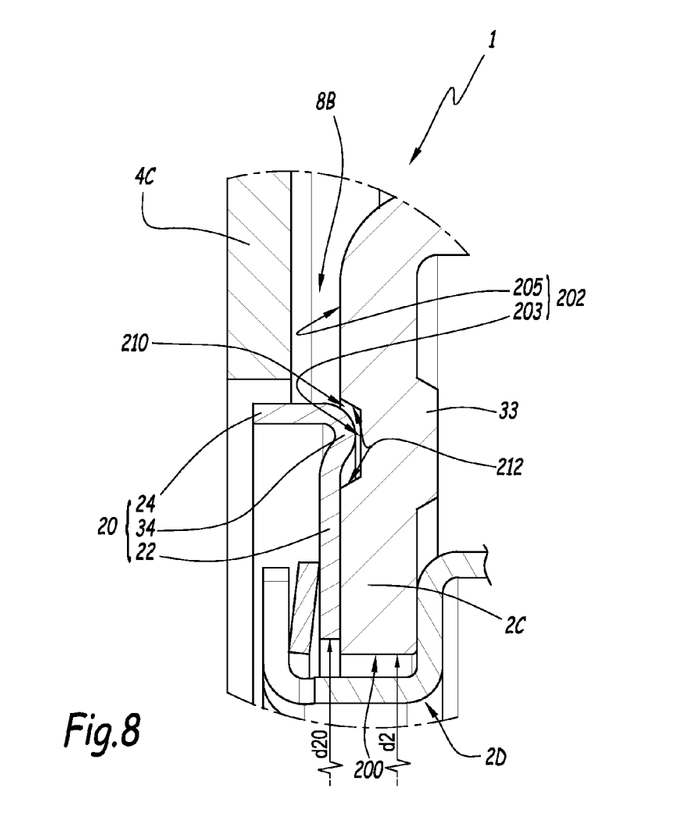
FIG. 8 is a cut view similar to FIG. 4 for the bearing of FIG. 7.

In the fourth embodiment of the invention, which is shown in FIGS. 7 and 8, the recess is a groove 210 provided in inner surface 202 of the radial end portion 2C. The groove 210 is limited radially by two frustoconical edges 212 and axially by a floor 203. The groove 210 is formed by stamping the inner ring 2 which generates a overhanging portion 33 in outer surface 204. The transition between portion 22 and skirt 24 is performed by a protruding portion 34 which is inserted in the groove 210. The flat annular portion 22 of flange 20 is in contact with the surface 202.

Figure 9:
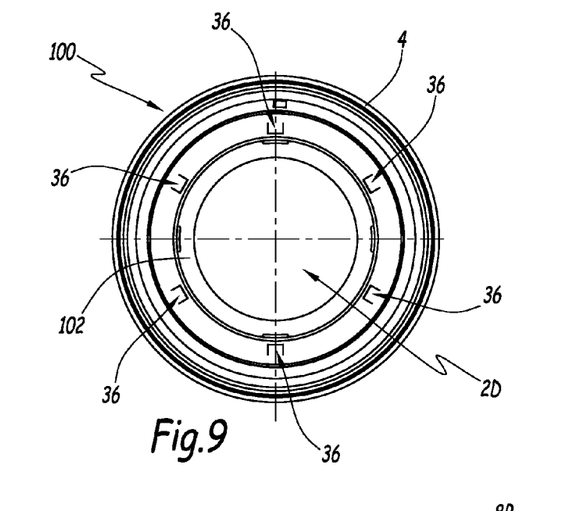
FIG. 9 is a rear view similar to FIG. 7, for a bearing according to a fifth embodiment of the invention.
Figure 10:
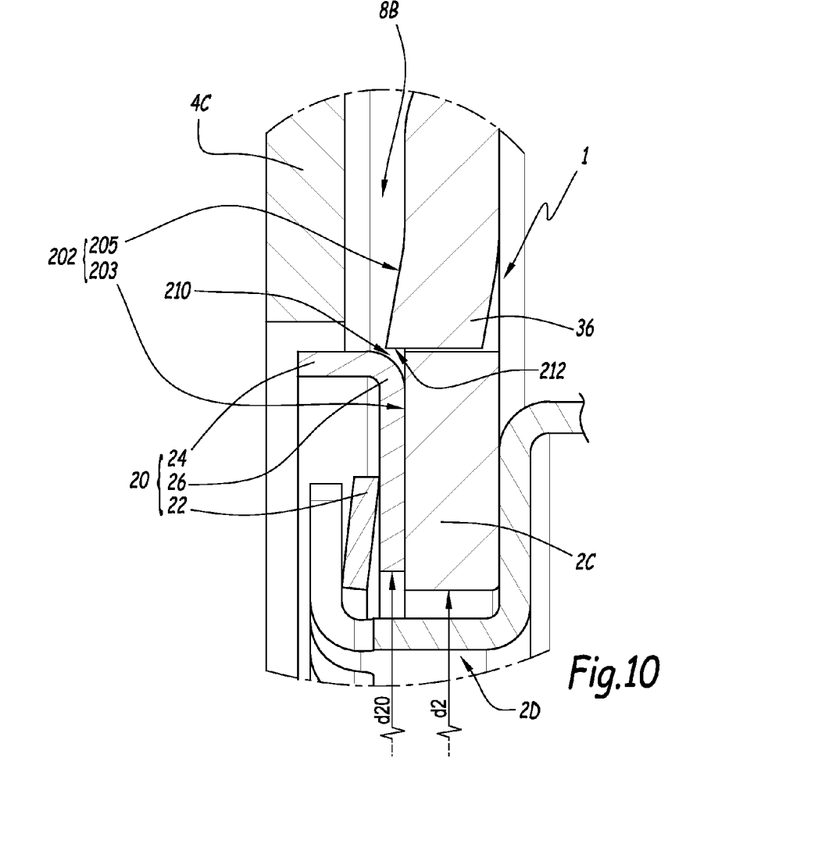
FIG. 10 is a cut view similar to FIG. 4, for the bearing of FIG. 9.

In the fifth embodiment of the invention, which is shown in FIGS. 9 and 10, radial end portion 2C of inner ring 2 is provided with six punched out portions 36. Punched out portions 36 are formed by cutting or punching of inner ring 2 and are bent towards the outer ring 4. Punched out portions 36 define six recesses 210 for the flange 20, each recess 200 being provided with a radial edge 212. The curved portion 26 of the flange 20 is axially aligned with inclined edge 212.

Figure 11:
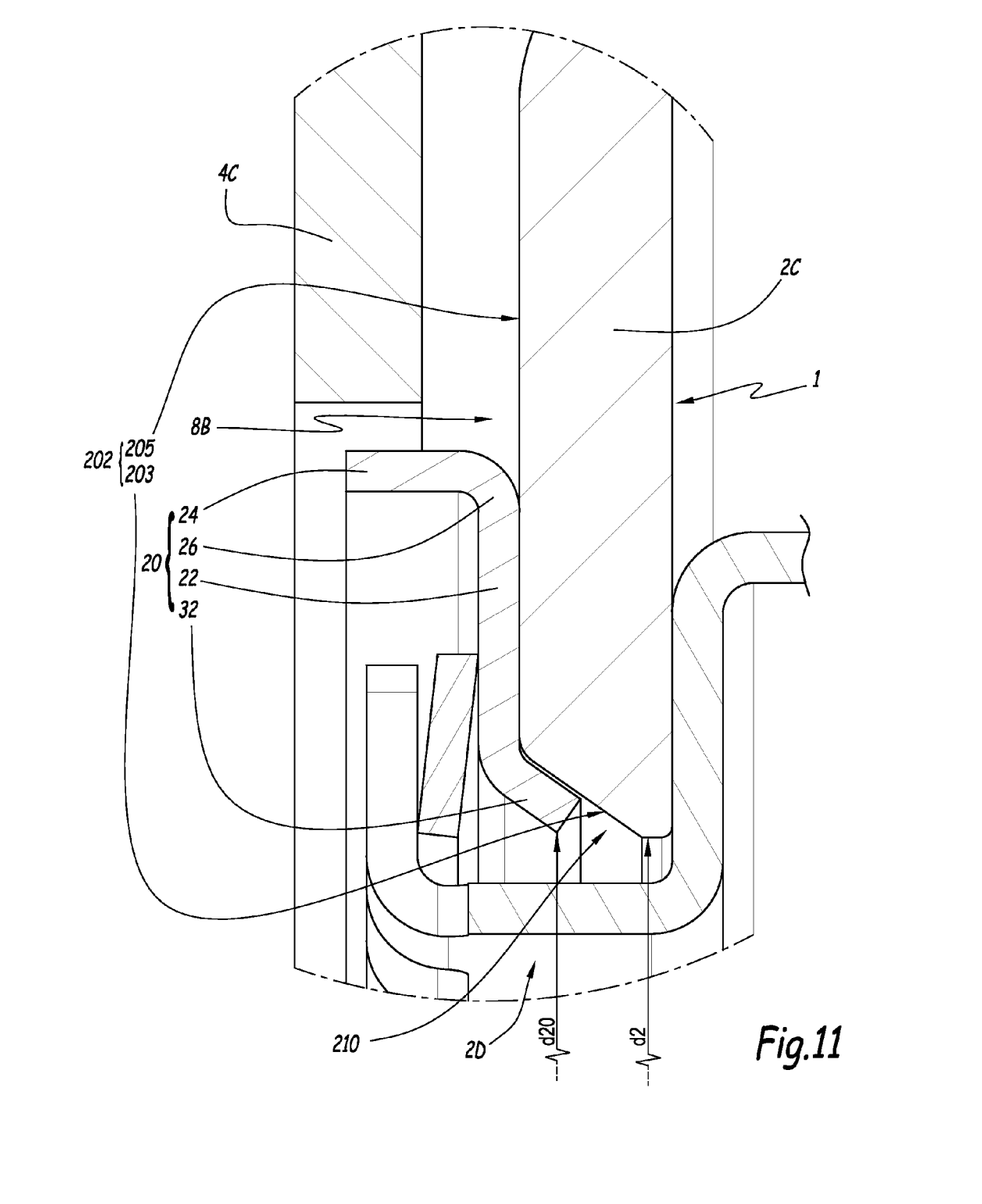
FIG. 11 is a cut view similar to FIG. 4, for a bearing according to a sixth embodiment of the invention.

In the sixth embodiment of the invention, which is shown in FIG. 11, recess is defined by a chamfer 210. Flange 20 is equipped with a flat annular portion 22, which is in contact with inner surface 202, and with a bent radial inner end 32, which is in contact with floor 203 of chamfer 210.

Figure 12:
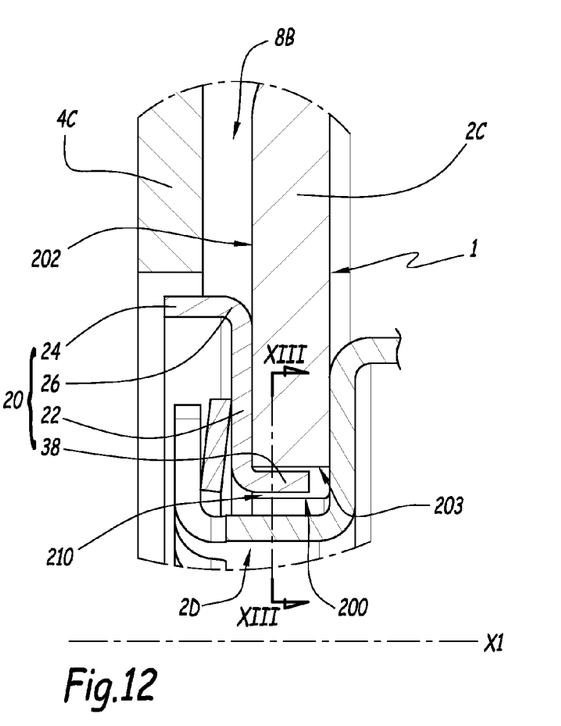
FIG. 12 is a cut view similar to FIG. 4, for a bearing according to a seventh embodiment of the invention.
Figure 13:
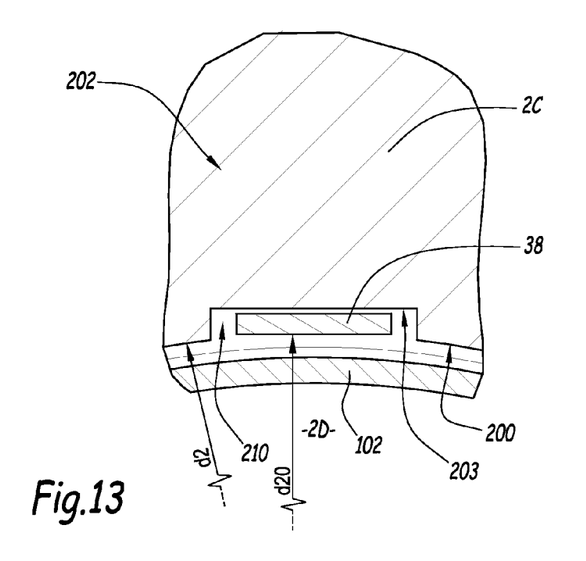
FIG. 13 is a partial radial sectional view of the device of FIG. 12, along cutting section XIII-XIII.

In the seventh embodiment of the invention, which is shown in FIGS. 12 and 13, recess is defined by at least three radial notches 210 provided on the radial edge 200 of inner ring 2. The radial floor 203 of the notches 210 is parallel to edge 200 and is perpendicular to inner surface 202 of inner ring 2. Flange 20 is provided with a flat annular portion 22, which is in contact with inner surface 202, and with at least three axial inner protrusions 38 which are inserted in notches 210. Actually, one protrusion 38 is inserted into each notch 210, along a direction parallel to central axis X1 of bearing 1. Protrusions 38 are flat as shown in FIG. 13. Alternatively, protrusions 38 are curved. The notches 210 define an indexation element for the flange 20 with respect to the inner ring 2.

In the embodiments of FIGS. 5 to 11, recess or recesses 210 is/are open towards inner bore 2D defined as in the first embodiment.

In the embodiments of FIGS. 6 to 13, one has the relationship d20>d2, where d20 and d2 are defined as in the first embodiment. Alternatively, in all embodiments, diameters d2 and d20 can be equal to each other.

In a variant of the invention that is not shown and may apply to all embodiments, flange 20 is equipped with a moulded lip for fulfilling a sealing function, which bears slidably against outer ring 4.

Flange 20 is made of metal. Alternatively, flange 20 is made of a plastic material.

The invention is described with a clutch bearing device having a hydraulic control subassembly. However, it is applicable to a control device controlled by a fork or by any other equivalent mechanism.

The embodiments and alternative embodiments mentioned here-above can be combined in order to generate new embodiments of the invention.

What is claimed is:

1. A bearing forming a clutching-declutching bearing for a motor vehicle, the bearing defining a central axis and including:
   an outer ring free to rotate around the central axis;
   an inner ring;

rolling elements disposed between the outer ring and inner ring; and a flange mounted on the inner ring, wherein the flange is at least partially inserted in a recess which is provided in a radial end portion of the inner ring and which is distinct from an inner bore of the inner ring, wherein a diameter of an inner bore of the flange is one of greater than or equal to a diameter of the inner bore of the inner ring.

2. The bearing according to claim 1, wherein the recess of the inner ring is axially open towards the inner bore of the inner ring, wherein the recess is provided on an outer surface of the radial end portion of the inner ring.

3. The bearing according to claim 2, the flange further including a flat annular portion inserted in the recess and an external skirt.

4. The bearing according to claim 2, the flange further including a flat annular portion folded over a central portion equipped with an external skirt.

5. The bearing according to claim 2, wherein the flat annular portion is in contact with the inner surface and the flange includes a bent inner radial end which is inserted in the recess.

6. The bearing according to claim 1, wherein the recess is a groove provided on an inner surface of the radial end portion of the inner ring and in that the flange includes a flat annular portion, an external skirt and a protruding portion inserted in the recess and which connects the flat annular portion and the external skirt.

7. The bearing according claim 1, wherein the recess is defined by at least one punched out portion of the inner ring, wherein the punched out portion is axially bent towards the outer ring.

8. The bearing according to claim 1, wherein the recess is defined by a chamfer and in that the flange is provided with a bent inner radial end inserted in the chamfer.

9. The bearing according to claim 1, wherein the recess is defined by at least one notch provided on a radial edge of the inner ring and in that an internal protrusion of the flange is inserted in the notch.

10. The bearing according to claim 1, wherein the recess is formed by at least one of:
    a stamping,
    a cutting, and
    a punching process.

11. The bearing according to claim 1, wherein the flange acts as a sealing device for sealing an opening between the outer ring and the inner ring.

12. The bearing according to claim 11, wherein in operation, the flange remains at one of:
    a distance from the outer ring so as to form a labyrinth sealing,
    contacts the outer ring, or
    contacts the outer ring by an elastomeric portion.

13. A clutch bearing device comprising a metal sleeve for reception of a control device and a bearing, the bearing defining a central axis and including:
    an outer ring free to rotate around the central axis;
    an inner ring;
    rolling elements disposed between the outer ring and inner ring; and
    a flange mounted on the inner ring,
    wherein the flange is at least partially inserted in a recess which is provided in a radial end portion of the inner ring and which is distinct from an inner bore of the inner ring,
    wherein the bearing is capable of acting on a diaphragm spring of a clutch mechanism and wherein
    a diameter of an inner bore of the flange is one of greater than or equal to a diameter of the inner bore of the inner ring.

14. A motor vehicle equipped with a clutch bearing device and a bearing, the bearing defining a central axis and including:
    an outer ring free to rotate around the central axis;
    an inner ring;
    rolling elements disposed between the outer ring and inner ring; and
    a flange mounted on the inner ring,
    wherein the flange is at least partially inserted in a recess which is provided in a radial end portion of the inner ring and which is distinct from an inner bore of the inner ring, wherein
    a diameter of an inner bore of the flange is one of greater than or equal to a diameter of the inner bore of the inner ring, and wherein
    the clutch bearing device is assembled to the motor vehicle.

* * * * *